United States Patent
Kitta et al.

(10) Patent No.: US 10,903,709 B2
(45) Date of Patent: Jan. 26, 2021

(54) ARMATURE OF ELECTRIC MOTOR

(71) Applicant: Mitsubishi Electric Corporation, Tokyo (JP)

(72) Inventors: Yoshiaki Kitta, Tokyo (JP); Hironori Tsuiki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 164 days.

(21) Appl. No.: 16/197,776

(22) Filed: Nov. 21, 2018

(65) Prior Publication Data

US 2019/0356190 A1    Nov. 21, 2019

(30) Foreign Application Priority Data

May 18, 2018  (JP) ................................. 2018-095864

(51) Int. Cl.
   *H02K 3/38*     (2006.01)
   *H02K 3/52*     (2006.01)

(52) U.S. Cl.
   CPC .............. *H02K 3/38* (2013.01); *H02K 3/522* (2013.01); *H02K 2203/09* (2013.01); *H02K 2203/12* (2013.01)

(58) Field of Classification Search
   CPC ...... H02K 3/38; H02K 3/522; H02K 2203/09; H02K 2203/12; H02K 5/225
   See application file for complete search history.

(56) References Cited

U.S. PATENT DOCUMENTS

| 7,557,478 | B2 * | 7/2009 | Hoshika ................ | H02K 3/522 310/180 |
| 2007/0232094 | A1 | 10/2007 | Hoshika | |
| 2009/0152975 | A1 * | 6/2009 | Sasaki .................... | H02K 3/522 310/195 |
| 2015/0162796 | A1 | 6/2015 | Okamoto et al. | |

FOREIGN PATENT DOCUMENTS

| CN | 101047327 A | 10/2007 |
| CN | 101552509 A | 10/2009 |
| JP | 2007-267569 A | 10/2007 |
| JP | 2009-148026 A | 7/2009 |

(Continued)

OTHER PUBLICATIONS

Communication dated Jul. 2, 2019, from the Japanese Patent Office in counterpart Application No. 2018- 095864.

(Continued)

*Primary Examiner* — Dang D Le
(74) *Attorney, Agent, or Firm* — Sughrue Mion, PLLC; Richard C. Turner (57) ABSTRACT

An insulating holder is provided with a bobbin portion and bus bar supporting portions, and the bus bar supporting portions have bus bar walls which electrically separate each of the bus bars, and step portions are formed, in a lamination direction of the bus bars, at the bus bar walls. Gap portions are formed, between the bus bars and the bus bar walls, in a longitudinal direction of the bus bars and in a lamination direction of the cores, at the step portion, and an insulating cap, which complements the gap portions from the outside and maintains the bus bars, is provided, in a state where the bus bars are installed to the bus bar walls.

8 Claims, 7 Drawing Sheets

(56) References Cited

FOREIGN PATENT DOCUMENTS

| | | | |
|---|---|---|---|
| JP | 2010-063273 | A | 3/2010 |
| JP | 2010-119238 | A | 5/2010 |
| JP | 5837182 | B2 | 12/2015 |
| JP | 2016-63653 | A | 4/2016 |
| JP | 5998525 | B2 | 9/2016 |

OTHER PUBLICATIONS

Communication dated Nov. 24, 2020 by the China National Intellectual Property Administration in application No. 201910384683.8.

* cited by examiner

A-A CROSS SECTION

FIG. 10

B-B CROSS SECTION

ARMATURE OF ELECTRIC MOTOR

BACKGROUND OF THE INVENTION

Field of the Invention

The present invention relates to an armature of an electric motor, and more particularly, relates to an armature structure of an electric motor which includes an insulating holder by which portions between each of a plurality of bus bars arranged at the outside of armature cores, and a coil wound around the armature cores, are insulated and maintained.

Description of the Related Art

For example, a three-phase AC motor such as a three-phase brushless motor and a three-phase linear motor is comprised of an armature, in which a plurality of armature cores composed of laminated steel sheets, are arranged in parallel, and a movable element (a rotor) faced to the armature and similarly composed of laminated steel sheets. Moreover, the armature cores are comprised of coils wound around an outer circumference of a teeth portion of the armature cores, and an insulating holder by which a plurality of bus bars which are laminated in an annular shape at the outside of the armature cores, are supported, and thereby portions between the bus bars are insulated and maintained.

Heretofore, as conventional methods for strongly insulating and maintaining the portions between a plurality of the bus bars, there has been proposed a method in which an annular shape separation wall which holds a plurality of the bus bars laminated in a diameter direction respectively, and which protrudes from a base portion between each of the bus bars to one side in a shaft direction, is provided, and an insulating holder, which is configured in such a way that a creepage distance (a distance along a disposed surface) is larger than a space distance (the shortest distance) between each of the bus bars, is provided (refer to Patent Document 1).

There has been other method in which a maintaining component, by which a plurality of bare conductors having an annular shape are concentrically insulated and maintained, is provide, and the maintaining component is comprised of a main unit to which the bare conductors having an annular shape are respectively inserted, and a protrusion having a tube shape, which covers the bare conductors having an annular shape by a protrusion insertion hole which is protruded from a side surface of the main unit along the bare conductors having an annular shape, and the main unit and the protrusion having a tube shape are integrally formed by a resin (refer to Patent Document 2).

CONVENTIONAL ART DOCUMENT

Patent Document

[Patent Document 1]
Japanese Laid-Open Patent Publication No. 2010-63273
[Patent Document 2]
Japanese Patent Publication No. 5998525
[Patent Document 3]
Japanese Patent Publication No. 5837182

SUMMARY OF THE INVENTION

However, in the components which are described in the above-described Patent Document 1 and Patent Document 2, any of insulating holders is configured for an insulation capability between each of bus bars, in such a way that a creepage distance (a distance along a disposed surface) is larger than a space distance (the shortest distance) between each of the bus bars, so that the insulating holders are designed by using a method in which the insulation capability between each of the bus bars is mainly gained by a distance. Therefore, it is required that a considerable distance is secured in accordance with a treated voltage, causing the electric motor to be upsized.

In order to deal with the above-described problems, as described in Patent Document 3, there are components in which an insulating sheet continuously intervenes between each of bus bars, and the insulating sheet, the bus bars, and portions between each of holders are firmly fixed by using an adhesive material having an insulation capability. However, a paste process of the insulating sheet is increased for the components, and an enormous load is required in order to manage a crease and an inclination of the pasted sheet.

The present invention has been made to solve the above-described problems, and an object of the present invention is to provide an electric motor in which an insulating holder has a new configuration, whereby it is not required that an insulation capability between each of bus bars is secured by a distance, such as a space distance and a creepage distance, and even if an electric motor, by which a high voltage is treated, is used, the electric motor can have a very compact configuration, and an assembling process and a management process are simply and cheaply performed.

An armature of an electric motor, which is disclosed in the present invention, includes armature cores which are arranged in parallel with a constant distance; an insulating holder by which each of coils, which is wound around the armature cores, is insulated and maintained; a plurality of bus bars which are laminated and arranged at the outside of the armature cores, and are electrically connected to terminals of each of the coils which is wound around the armature cores; wherein the insulating holder is comprised of a bobbin portion which functions as a winding frame of the coils, and bus bar supporting portions by which portions between each of the bus bars are insulated and supported, and the bus bar supporting portions include bus bar walls which intervene between each of the bus bars, and electrically separate each of the bus bars, and step portions are formed, in a lamination direction of the bus bars, at the bus bar walls, and gap portions are formed, between the bus bars and the bus bar walls, in a longitudinal direction of the bus bars and in a lamination direction of the cores, at the step portions, and an insulating cap, which complements the gap portions from the outside and maintains the bus bars, is included, in a state where the bus bars are installed to the bus bar walls.

According to the armature of the present invention, even if an insulating film is not coated on the bus bars, and even if the armature is applied to an electric motor by which a high voltage is treated, a space distance and a creepage distance can be secured, and a configuration of an armature of an electric motor, which has a small configuration, can be obtained.

DETAILED DESCRIPTION OF THE PREFERRED EMBODIMENTS

Embodiment 1

Hereinafter, an armature of an electric motor according to Embodiment 1 of the present invention will be explained by using FIG. 1 through FIG. 10. In each of FIG. 1 through FIG. 10, the same reference symbols are given to the same or equivalent parts.

Figure 1:
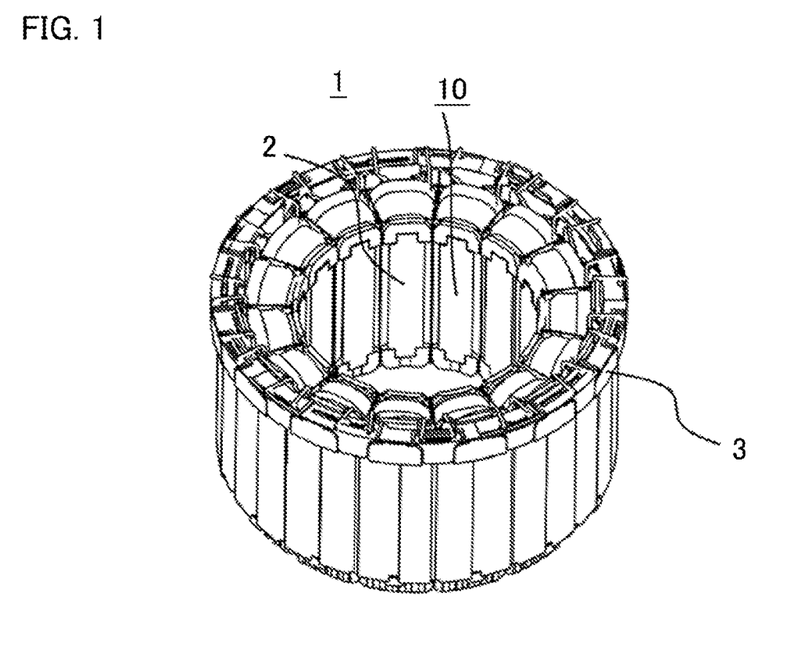
FIG. 1 is an oblique perspective view which indicates an armature configuration of an electric motor according to Embodiment 1.

FIG. 1 is an oblique perspective view which indicates an armature (a stator) 1 of a three-phase brushless motor according to Embodiment 1. The armature 1 is totally configured in an annular shape, and a rotor (which is not illustrated) is arranged, with a predetermined distance, at an inner circumference side of the armature 1.

The armature 1 is configured in such a way that a plurality of steel sheets are laminated, and the armature 1 is composed of a plurality of armature cores 10 which are radially arranged in parallel with equal pitches in a circumference direction, and each of the armature cores 10 is composed of each of teeth 2, which is protruded toward an inner circumference side, and a yoke 3 by which each of the teeth 2 is connected at an outer diameter side.

Figure 2:
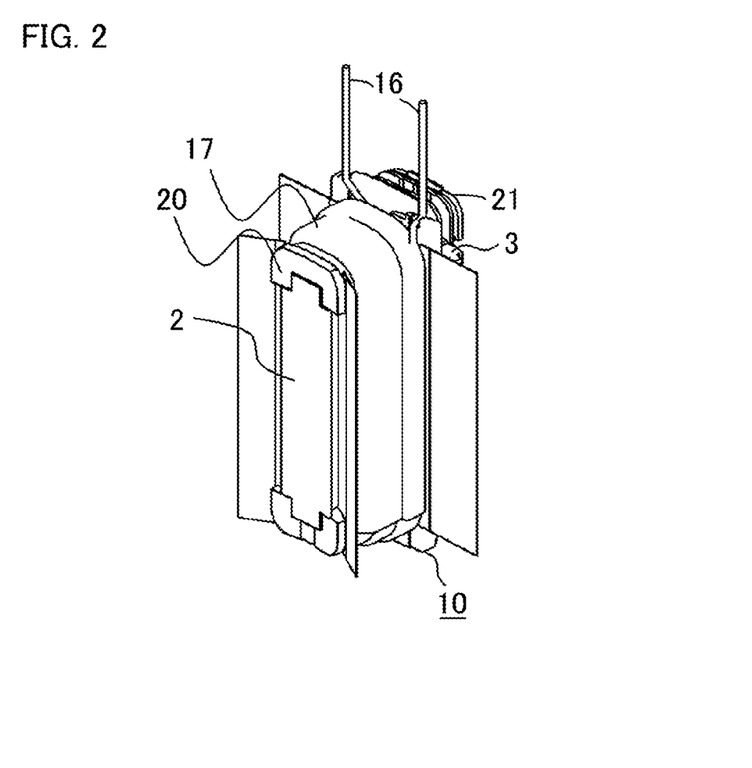
FIG. 2 is a partial oblique perspective view which indicates a divided armature core of the electric motor according to Embodiment 1.
Figure 3A:
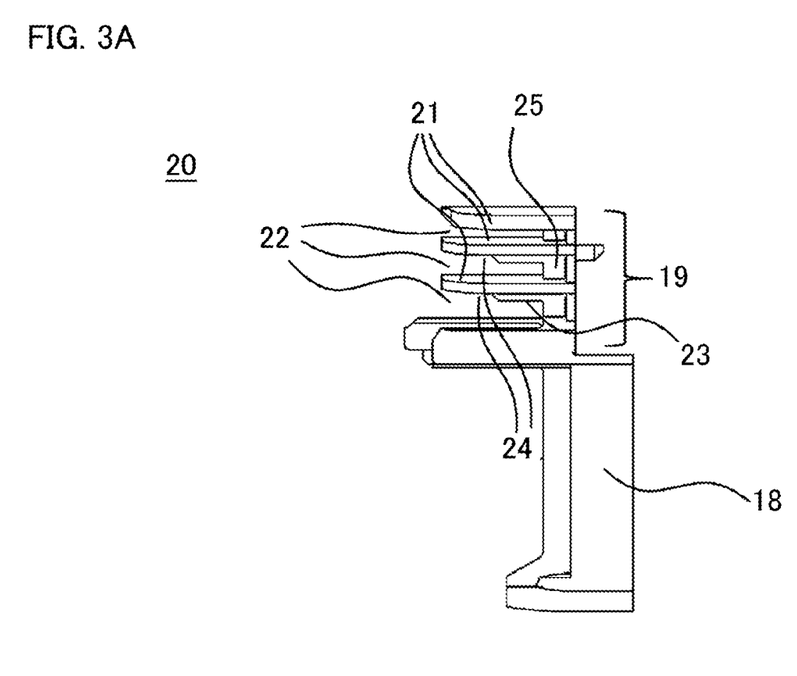
FIG. 3A is a side view which indicates an insulating holder which is used for an armature according to Embodiment 1.
Figure 3B:
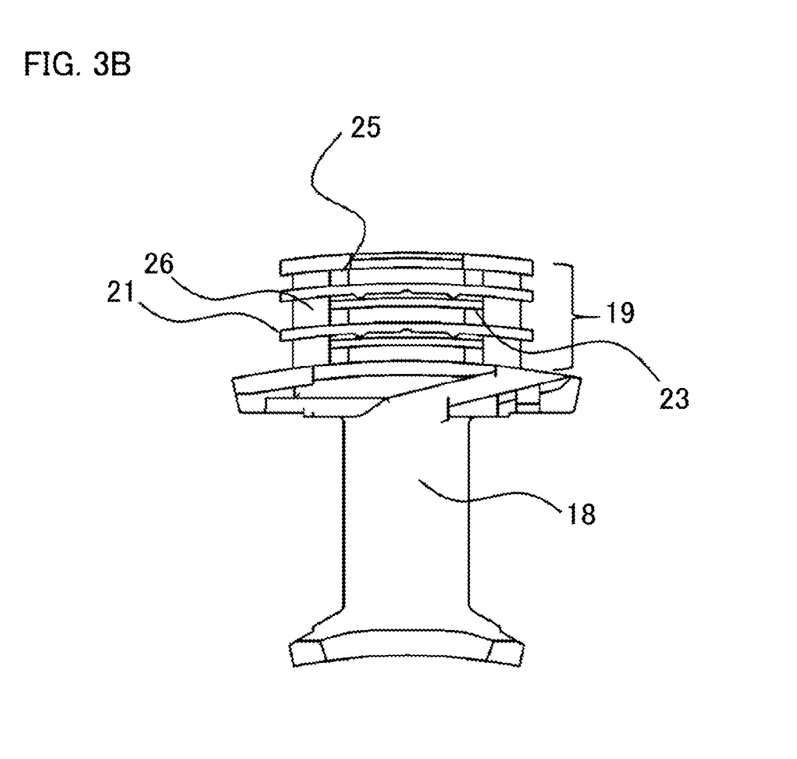
FIG. 3B is a plane view which indicates the insulating holder which is used for the armature according to Embodiment 1.

At each of the teeth 2 of the armature cores 10, as indicate in FIG. 2, a coil 17, for which each of conductive wires having an insulating film is wound, coil terminals 16 which are led from the coil 17, and an insulating holder 20, which is minutely explained in FIG. 3A and FIG. 3B, are arranged. The insulating holder 20 is composed of a bobbin portion 18, which is used as a winding frame of the coil 17, and bus bar supporting portions 19 by which portions between bus bars and the armature cores 10 and portions between each of the bus bars are insulated and supported. In FIG. 3A and FIG. 3B, although it is indicated that the bobbin portion 18 and the bus bar supporting portions 19 are integrally configured, it is suitable that the bobbin portion 18 and the bus bar supporting portions 19 are respectively configured.

Figure 4:
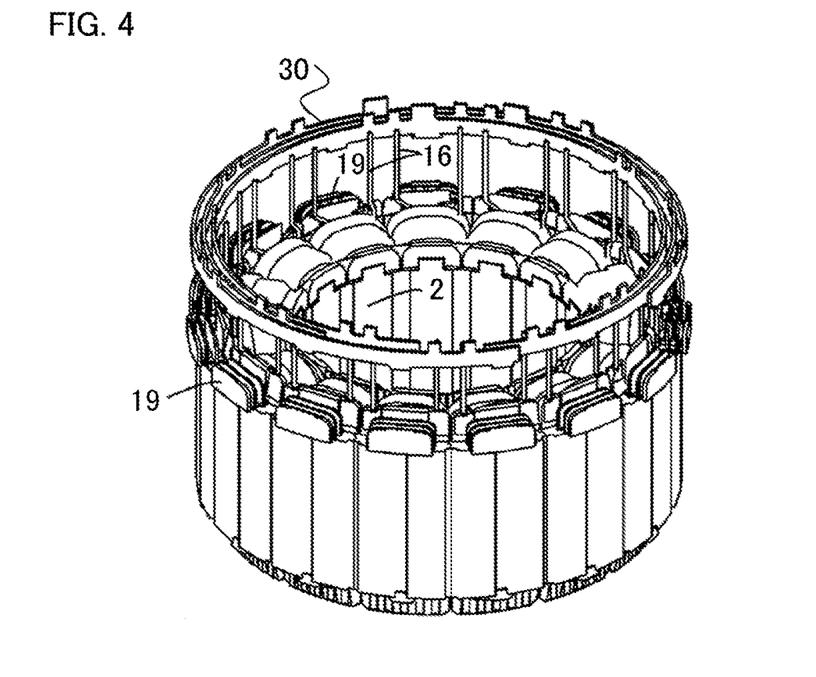
FIG. 4 is an oblique perspective view which indicates an assembly phase of the armature according to Embodiment 1.

As indicated in FIG. 4, bus bars 30 are used as conductive belts formed in an annular shape, and have a multi-phase (three-phase) configuration. FIG. 4 indicates a state before the bus bars 30 are installed, to the bus bar supporting portions 19, in a shaft direction (a lower direction with respect to a plane in FIG. 4).

As recognized in reference to FIG. 3A and FIG. 3B, the bus bar supporting portions 19 include bus bar walls 21 which are stood in parallel in a state where bus bar ditches 22 are separated, and the other bus bars 30 are installed to each of the bus bar ditches 22, whereby each of the bus bars 30 is electrically separated each other.

In order to offset the bus bar 30 from the bus bar walls 21, at portions of the bus bar walls 21, step portion 23 are formed, in a lamination direction (a left direction with respect to a plane in FIG. 3A) of the bus bars 30, and at remained portions of the step portion 23, in other words, between the bus bars 30 and the bus bar walls 21. gap portions 24, which are straddled in a longitudinal direction (a direction which is orthogonal with respect to a plane in FIG. 3A) of the bus bars 30 and in a lamination direction (an upper-lower direction with respect to a plane in FIG. 3A) of the armature cores 10, are formed. Moreover, at the bus bar ditches 22, there are offset portions 25, by which a space distance "X" between the armature cores 10 and the bus bars 30 is secured, and convex portions 26 by which a creepage distance between the armature cores 10 and the bus bars 30 is secured.

Hereinafter, an assembling method of the armature of the present invention will be indicated.

Firstly, the divided armature cores 10, which are indicated in FIG. 2, are arranged in an annular shape as indicated in FIG. 1. It is suitable that each of the armature cores 10, which are arranged in an annular shape, is connected by a welding process, or it is suitable that each of the armature cores 10 is supported by using a jig until each of the armature cores 10 is pressed and inserted by using a frame.

Secondly, as indicated in FIG. 4, the bus bars 30, which are described above, are inserted to the bus bar ditches 22 (refer to FIG. 3A) of the insulating holder 20 from an upper side in a shaft direction. After that, as indicated FIG. 5, an insulating cap 40 is assembled on the bus bars 30.

Figure 6:
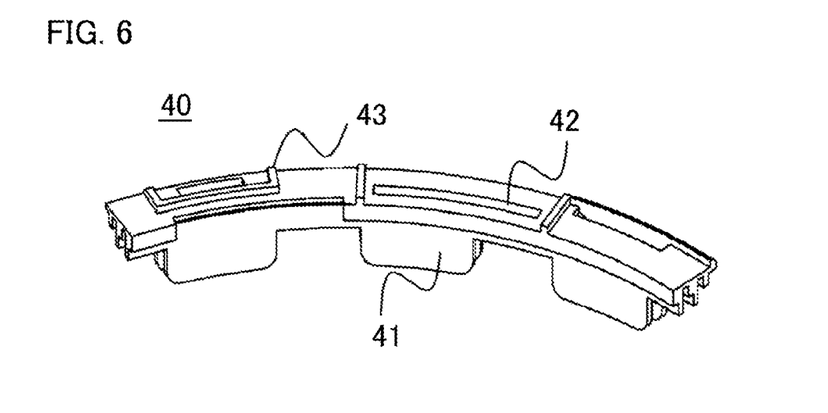
FIG. 6 is an oblique perspective view which indicates an insulating cap of the armature according to Embodiment 1.

A configuration of the insulating cap 40 is indicated in FIG. 6. The insulating cap 40 is divided in a longitudinal direction of the bus bars 30, and divided surfaces are formed at locations at which the bus bar walls 21 of the insulating holder 20 are provided. At the insulating cap 40, there are insulating walls 41 which are fitted and installed to the corresponding bus bar ditches 22 of the insulating holder 20, and are configured in such a way that the insulating walls 41 complement gap portions in the bus bar ditches 22; bus bar holes 42 by which the bus bars 30 and the coil 17 are connected; and a protruding portion 43 by which a creepage distance between each end of the bus bars 30 is secured.

Lastly, the coil terminals 16 are inclined toward an outer diameter side, and are connected to the bus bars 30, whereby the armature 1 is completed.

Figure 7:
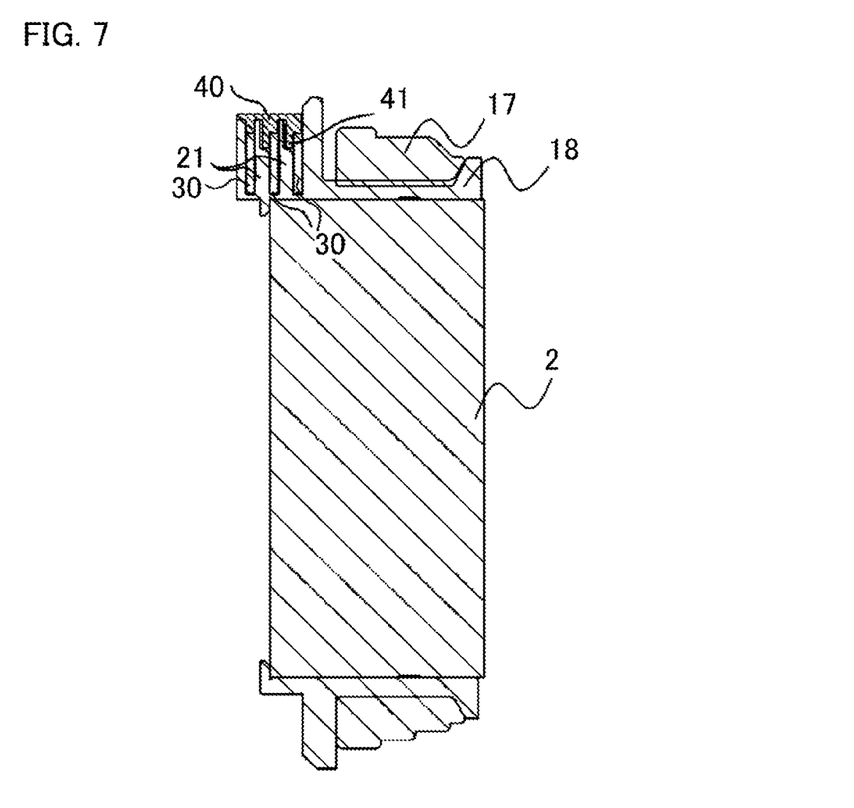
FIG. 7 is a cross-sectional view which indicates a teeth portion in a state where the insulating cap of the armature according to Embodiment 1 is installed.
Figure 8:
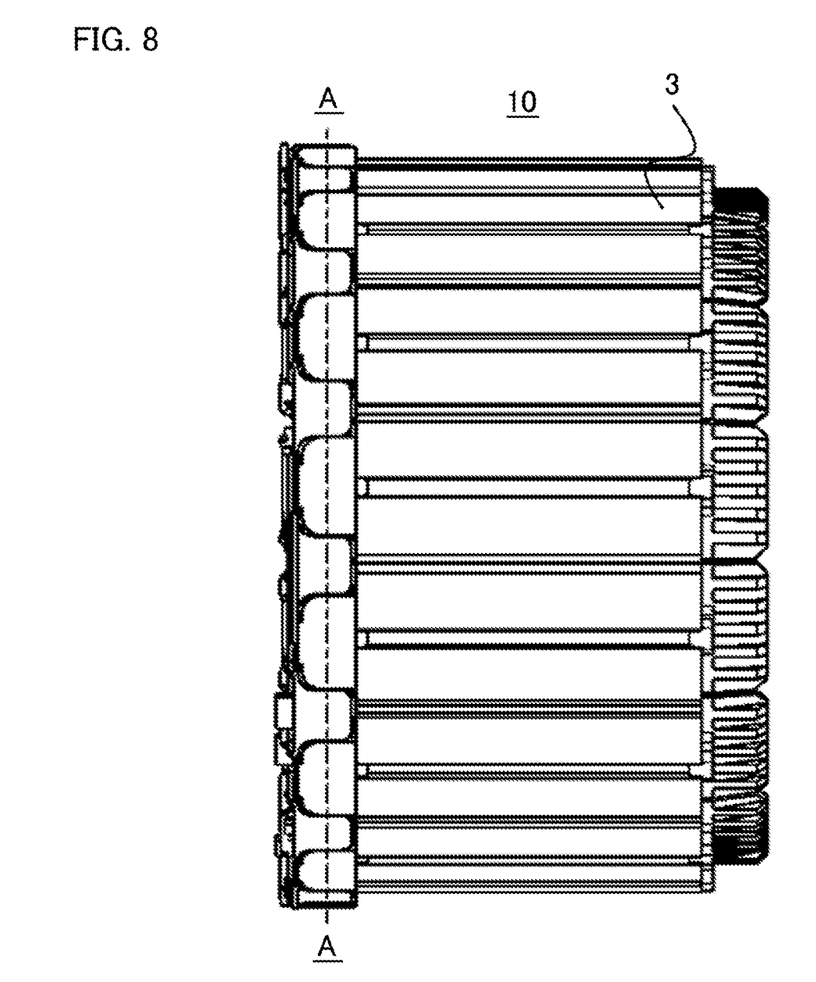
FIG. 8 is a side view which indicates a state after an assembly process of the armature according to Embodiment 1 is completed.
Figure 9:
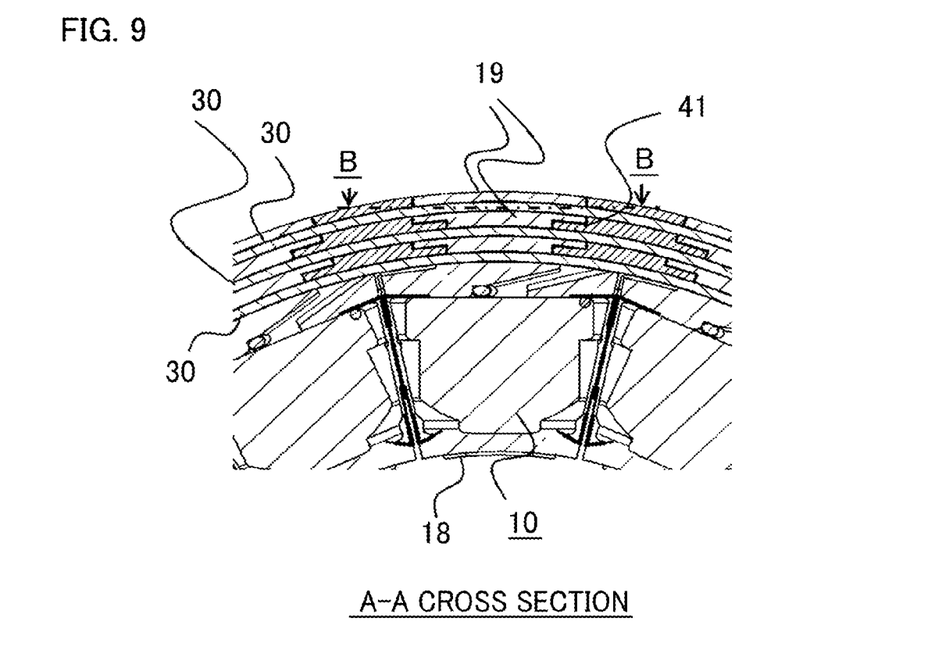
FIG. 9 is a cross-sectional view along an "A-A" line in FIG. 8.
Figure 10:
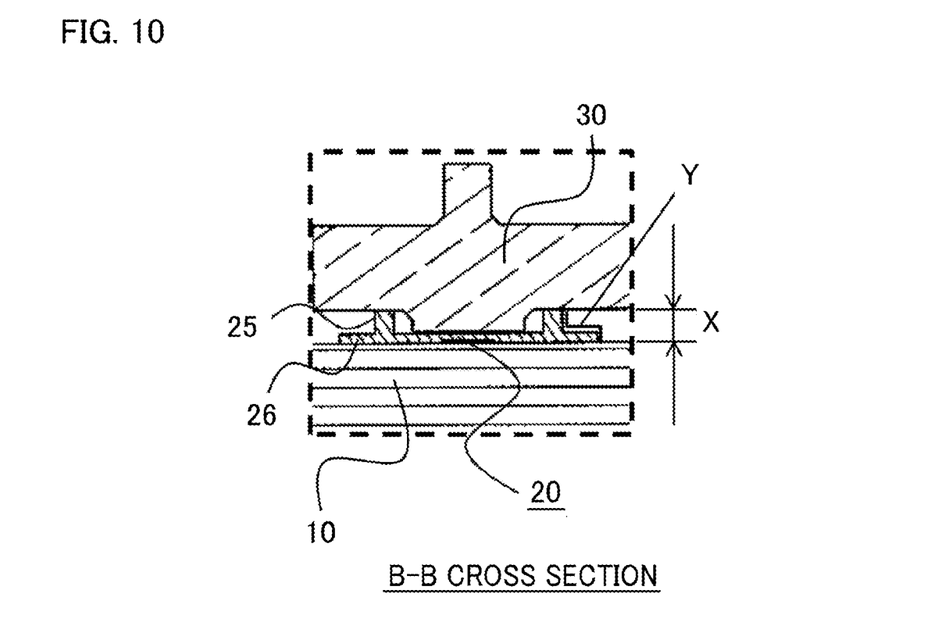
FIG. 10 is a cross-sectional view along a "B-B" line in FIG. 9.

FIG. 7 is a cross-sectional view which indicates a teeth portion in a state where the insulating cap 40 is installed after the bus bars 30 are installed to the insulating holder 20, and FIG. 8 is a side view which indicates the armature 1, and FIG. 9 indicates a cross-sectional view along an "A-A" line in FIG. 8, and FIG. 10 indicates a cross-sectional view along a "B-B" line in FIG. 9.

As understood in reference to FIG. 7, end surfaces of the bus bars 30, in a diameter direction (a left-right direction with respect to a plane in FIG. 7), are fixed, in a state where the end surfaces closely adhere to each other, by using the bus bar walls 21 of the insulating holder 20 and the insulating walls 41 of the insulating cap 40, and moreover, end surfaces of the bus bars 30, in a shaft direction (a upper-lower direction with respect to a plane in FIG. 7) are fixed, in a state where the end surfaces closely adhere to each other, by using a base portion of the insulating cap 40. Thereby, each of the bus bars 30 secures a creepage distance in a state where each of the bus bars 30 are electrically divided each other. Moreover, space distances between the armature cores 10 and the bus bars 30 are secured by using the offset portions 25 of the insulating holder 20, and creepage distances between the armature cores 10 and the bus bars 30 are secured by using the convex portions 26 of bobbin portion 18.

Because the armature 1 is configured as described above, even if an insulating film is not coated on the bus bars 30, the space distances and the creepage distances can be secured, and the armature 1 can be configured with a small configuration.

In Embodiment 1, although the electric motor has a configuration of a rotary electric machine having a cylinder shape, the electric motor can be applied to a linear motor which is formed in a linear shape.

Embodiment 2

Figure 11:
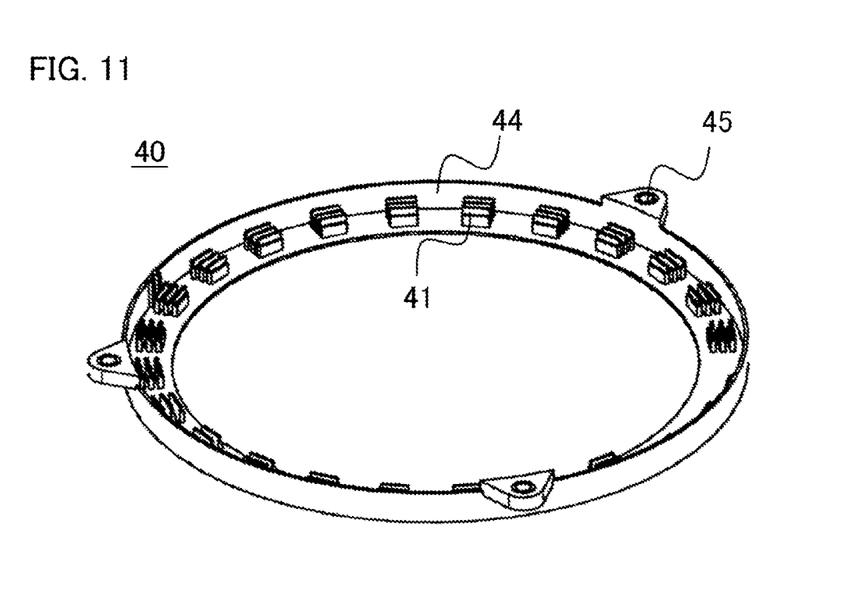
FIG. 11 is an oblique perspective view which indicates an insulating cap of an armature according to Embodiment 2.

Hereinafter, an armature of an electric motor according to Embodiment 2 of the present invention will be explained by using FIG. 11 through FIG. 12. In each of FIG. 11 through FIG. 12, the same reference symbols are given to the same or equivalent parts. Embodiment 2 shows a deformation example of an insulating cap 40. The insulating cap 40, according to, which is indicated in FIG. 11, is formed in an annular shape of one circle, and insulating walls 41 are provided with an equal distance at the insulating cap 40. Moreover, a flange 44 is provided at an outer shape side, and attaching holes 45 are provided.

Figure 5:
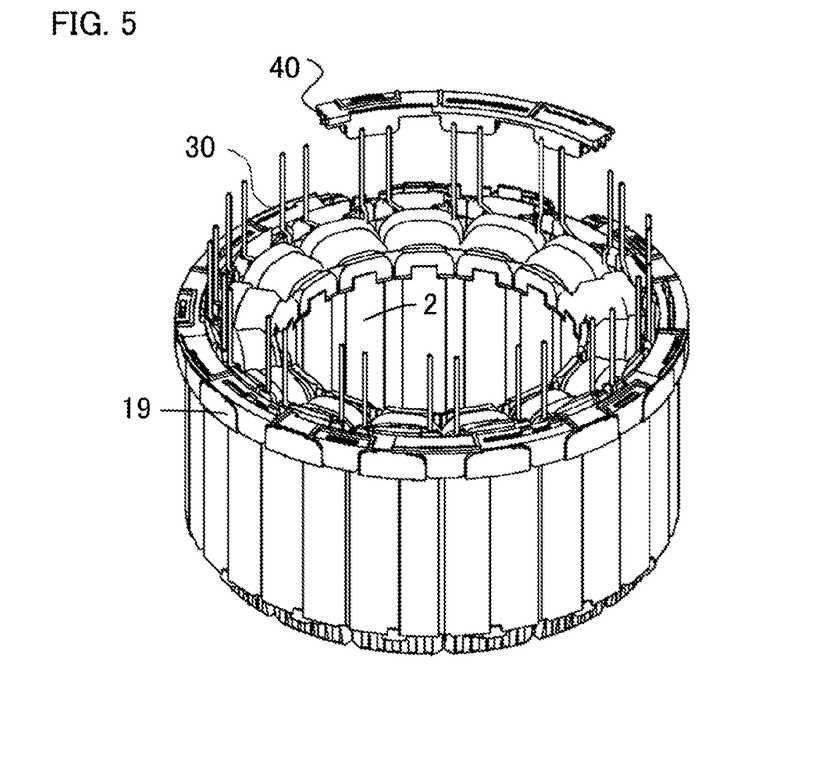
FIG. 5 is an oblique perspective view which indicates the other assembly phase of the armature according to Embodiment 1.
Figure 12:
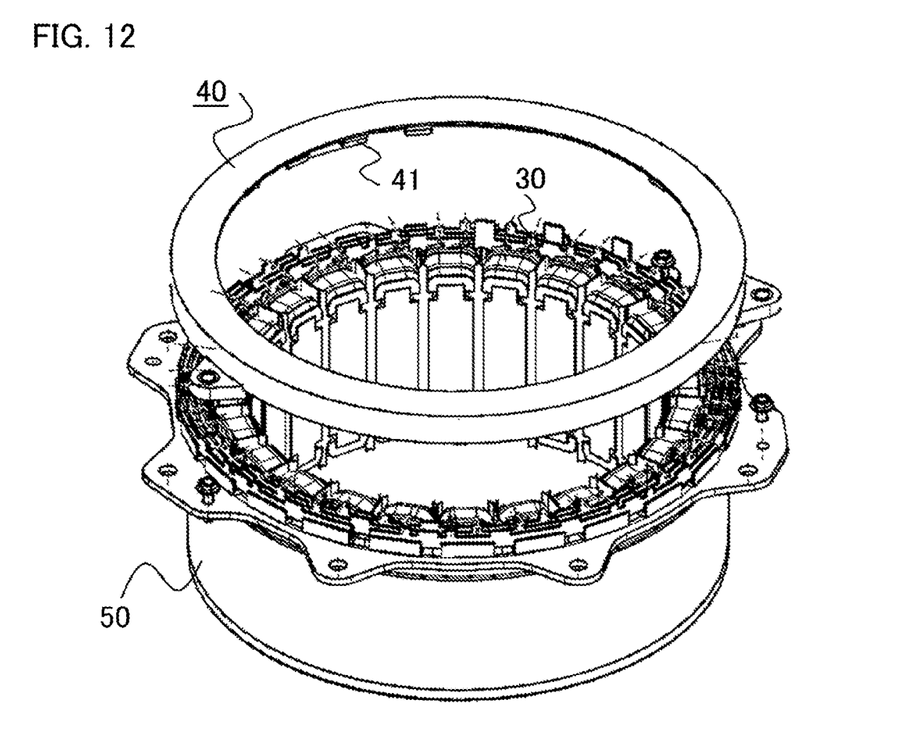
FIG. 12 is an oblique perspective view which indicates an assembly state of the armature according to Embodiment 2.

As indicated FIG. 12, an assembling process of an armature 1 according to Embodiment 2, in which the insulating cap 40, which is indicated in FIG. 11, is inserted from a shaft direction of the armature 1 to bus bars 30, which are arranged in an annular shape, by using a similar way which is indicated in FIG. 5 according to Embodiment 1, in a state where upper and lower sides of the insulating cap 40 are reversed, in such a way that the insulating walls 41 complement gap portions (which are not illustrated) between bus bar ditches 22 of an insulating holder 20, is similar to an assembling process of the armature 1 according to Embodiment 1. The insulating cap 40 is fixed in such a way that the insulating cap 40 is fixed, by using a screw, to a flange of a frame 50 which is provided at the armature 1.

In the armature 1 according to Embodiment 2, the insulating cap 40 is integrally configured in an annular shape, whereby the number of the components is decreased, and a configuration of the armature 1, which has a higher productivity, is realized.

In the disclosed present invention, although various and exemplary embodiments are described, various characteristics, modes, and functions, which are described in one or a plurality of embodiments, are not limited to an applicability of a specific embodiment, and can be applied to the embodiments in a single state or in various combination states.

Therefore, a number of deformation examples, which are not exemplified, are assumed in a field of a technology which is disclosed in the specification of the present invention. For example, it is assumed that a case in which at least one of components is deformed, and a case in which at least one of components is added, or a case in which at least one of components is omitted, and moreover, a case in which at least one of components is extracted and combined to a component of the other embodiment, are included.

What is claimed is:

1. An armature of an electric motor, comprising:
armature cores which are arranged in parallel with a constant distance;
an insulating holder by which each of coils, which is wound around the armature cores, is insulated and maintained;
a plurality of bus bars which are laminated and arranged at the outside of the armature cores, and are electrically connected to terminals of each of the coils which is wound around the armature cores; wherein
the insulating holder is composed of a bobbin portion which functions as a winding frame of the coils, and bus bar supporting portions by which portions between each of the bus bars are insulated and supported, and
the bus bar supporting portions include bus bar walls which intervene between each of the bus bars, and electrically separate each of the bus bars, and
step portions are formed, in a lamination direction of the bus bars, at the bus bar walls, and
gap portions are formed, between the bus bars and the bus bar walls, in a longitudinal direction of the bus bars and in a lamination direction of the cores, at the step portions, and
an insulating cap, which complements the gap portions from the outside and maintains the bus bars, is included, in a state where the bus bars are installed to the bus bar walls.

2. An armature of an electric motor according to claim 1, wherein the insulating cap includes insulating walls, which are fitted to the gap portions of the bus bar walls, and the bus bars are fixed by using the insulating walls and the bus bar walls.

3. An armature of an electric motor according to claim 2, wherein outer circumferences of the bus bars are respectively surrounded by using the bus bar walls of the insulating holder and the insulating cap.

4. An armature of an electric motor according to claim 1, wherein outer circumferences of the bus bars are respectively surrounded by using the bus bar walls of the insulating holder and the insulating cap.

5. An armature of an electric motor according to claim 1, wherein the insulating cap is divided in a longitudinal direction of the bus bars, and divided surfaces are formed at locations at which the bus bar walls of the insulating holder are provided.

6. An armature of an electric motor according to claim 1, wherein bus bar holes, by which the bus bars and the coils are connected, are provided at the insulating cap.

7. An armature of an electric motor according to claim 6, wherein a protruding portion is provided between a plurality of the bus bar holes which are provided at the insulating cap.

8. An armature of an electric motor according to claim 1, wherein the insulating cap is formed in annular shape, and insulating walls are provided, with an equal distance, on the insulating cap.

* * * * *